United States Patent [19]

Reynolds

[11] Patent Number: 4,695,784
[45] Date of Patent: Sep. 22, 1987

[54] VOLTAGE AND CURRENT LIMITING PHASE-TRIGGERED BATTERY CHARGER WITH CONTINUOUS OPTIMIZATION OF CHARGING RATE

[76] Inventor: William R. Reynolds, 63 Myrtle Ave., Madison, N.J. 07490

[21] Appl. No.: 904,785

[22] Filed: Sep. 4, 1986

Related U.S. Application Data

[63] Continuation of Ser. No. 728,819, Apr. 30, 1985, abandoned.

[51] Int. Cl.$^4$ ................................................ H02J 7/04
[52] U.S. Cl. ...................................... 320/32; 320/39; 320/48; 320/53; 323/231; 323/243
[58] Field of Search ................... 320/29, 32, 39, 48, 320/49, 53, 64; 323/231, 242, 243

[56] References Cited

U.S. PATENT DOCUMENTS 3,758,839  9/1973  Medlar ................................. 320/32

OTHER PUBLICATIONS

Boschert, Robert J., "Flyback converters: solid-state solution to low-cost switching power supplies", Electronics, Dec. 21, 1978, pp. 100–104.

Primary Examiner—Patrick R. Salce
Assistant Examiner—Anita M. Ault
Attorney, Agent, or Firm—Pearne, Gordon, McCoy & Granger

[57] ABSTRACT

A battery charging circuit includes a silicon controlled rectifier full wave bridge that has its input connected across a conventional 60 hertz alternating current power line. The output of the bridge provides 120 hertz pulsating direct current to the battery being charged. The duration of each direct current charging pulse is determined by phase triggering of the silicon controlled rectifiers in the bridge. The silicon controlled rectifiers are triggered at a predetermined, identical firing angles by a conventional unijunction transistor relaxation oscillator which in turn is regulated by an output voltage and output current sensing circuit that established the noted firing angles so as to regulate, and limit at desirable upper valves, the charging voltage and current applied to the battery. The output sensing circuit includes as primary components a pair of adjustable zener diodes operating in their linear or active regions so as to function as amplifiers, one for output current regulation and the other for output voltage regulation.

5 Claims, 2 Drawing Figures

VOLTAGE AND CURRENT LIMITING PHASE-TRIGGERED BATTERY CHARGER WITH CONTINUOUS OPTIMIZATION OF CHARGING RATE

This is a continuation, of application Ser. No. 728,819, filed on Apr. 30, 1985 now abandoned.

BACKGROUND OF THE INVENTION

The present invention relates in general to regulated power supplies, and more particularly to a circuit for charging a battery or bank of batteries under predetermined voltage and current requirements.

It is known in the art to charge a battery by applying to it pulsating direct current provided by a silicon controlled rectifier full wave bridge running directly from an alternating current power line. The duration or pulse width of each direct current pulse is regulated so as not to apply too much voltage or too much current to the battery undergoing charging. The regulation of the pulse width is accomplished by varying the firing angles of the silicon controlled rectifiers forming a part of the full wave bridge.

It is also known to use a unijunction transistor oscillator of the relaxation type for providing triggering pulses to the gates of the silicon controlled rectifiers at the appropriate times to establish the desired pulse widths for the direct current pulses being applied to the battery undergoing charging.

The pulse widths are varied by the oscillator in response to the sensing and continuous monitoring, in a closed loop feedback manner, of the output voltage applied across the battery and the output current provided to it by the charging circuit. A pair of operational amplfiers, one for output current regulation and one for output voltage regulation, in the output voltage and current monitoring feedback loops, regulates the operation of the oscillator, and thus the firing angles of the silicon controlled rectifiers in the bridge.

The use of operational amplifiers in the above-noted manner has inherent disadvantages in terms of desired response time, gain and temperature-stability.

SUMMARY OF THE INVENTION

In accordance with the present invention, a battery charging circuit provides a battery with a charging current not greater than a predetermined limit.

A sensing means monitors the amount of charging current provided to the battery by the charging circuit, and generates a first signal indicative of the amount of charging current.

A first adjustable zener diode, operating in its linear region so as to function as an amplifier, has an anode, a cathode, and a reference terminal to which is applied the first signal from the charging current sensing means. The amount of current flow through the first diode from cathode to anode is proportional to the amount of charging current being applied to the battery.

Means responsive to the current flow through the diode regulates the charging current to provide it to the battery at a level not greater than the predetermined current limit.

In further accordance with the invention, means for sensing the amount of charging voltage provided across the battery by the charging circuit is provided. The charging voltage sensing means generates a second signal indicative of the level of charging voltage.

A second adjustable zener diode, operating in its linear region so as to function as an amplifier, has an anode, a cathode, and a reference terminal to which is applied the second signal from the charging voltage sensing means. The amount of current flow through the second diode from cathode to anode is proportional to the amount of charging voltage being applied to the battery.

The means responsive to the current flow through the first diode is also responsive to the current flow through the second diode. The responsive means also regulates the charging voltage so that it is provided across the battery at a level not greater than a predetermined voltage limit.

In a preferred form, the responsive means is a unijunction transistor oscillator that provides triggering pulses to the gates of silicon controlled rectifiers forming parts of a full wave bridge connected directly across an alternating current power line. The bridge provides pulsating direct current to the battery being charged. The widths of the direct current pulses are regulated by the firing angles established by the triggering pulses provided by the oscillator which in turn is controlled by the current flows through the first and second adjustable zener diodes which are themselves in turn responsive to the charging voltage and charging current sensing means.

BRIEF DESCRIPTION OF THE DRAWINGS

A fuller understanding of the invention may be had by referring to the following description and claims taken in conjunction with the accompanying drawings, wherein:

DETAILED DESCRIPTION OF THE PREFERRED EMBODIMENT

Figure 1:
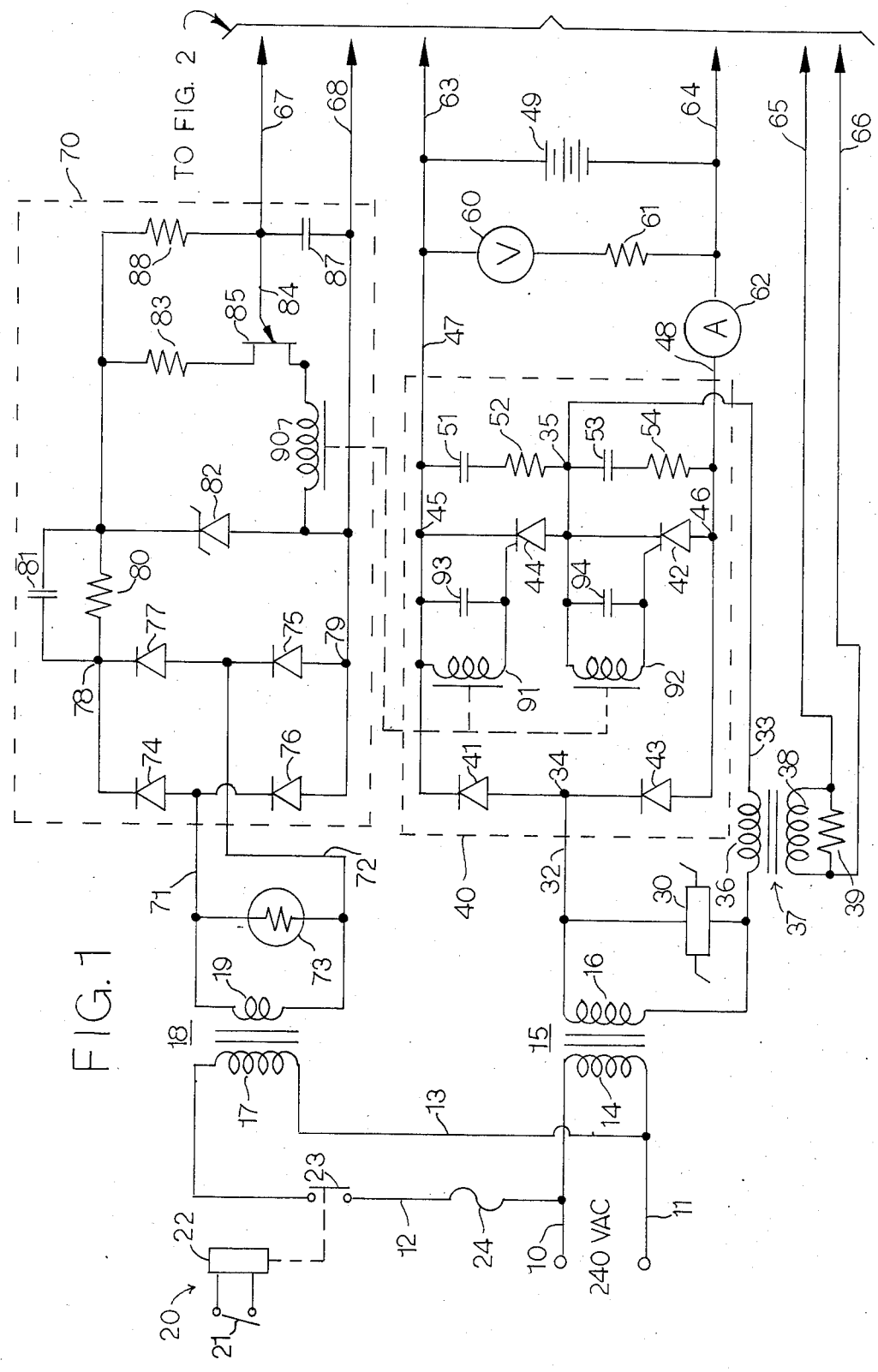
FIG. 1 is a schematic diagram of the main power portion of a battery charging circuit in accordance with the present invention.

With reference to FIG. 1, commercial line power, for example 240 volt alternating current at 60 hertz, is provided on a first pair of input power lines 10, 11. Connected in parallel to the first pair of input power lines 10 and 11 is a second pair of input power lines 12, 13. The 240 volt alternating current on the first pair of power lines 10, 11 is applied across a primary winding 14 of a main isolation transformer 15 having a secondary winding 16 as illustrated. The main isolation transformer 15 serves not only to isolate the power lines 10, 11 from the battery charging circuit, but also to provide a certain degree of reactance so as to limit damaging peak currents that the battery charging circuit could otherwise draw. In a similar manner, the alternating current on power lines 10, 11 is applied via the second pair of power lines 12, 13 across a primary winding 17 of a line isolation and step down transformer 18 having a secondary winding 19 is illustrated. The flow of power to the primary winding 17 of the line isolation and step down transformer 18 is controlled by an on/off relay 20 powered in a conventional fashion (not illustrated) and having an operator actuated switch 21 that energizes a relay coil 22 which in turn closes a normally open set of relay contacts 23. The contacts 23, when closed, form a series portion of power line 12 as does a conventional fuse 24 which protects the battery charger circuit from sustained overcurrent conditions. When the battery charging circuit in accordance with the present invention is in an operating or charging mode, contacts 23 are closed, and transformers 15 and 18 are energized.

With reference to the main isolation transformer 15, its secondary winding 16 has connected across it a metal oxide varistor 30 which acts as a surge suppressor to limit input peak voltages. From one end of the parallel connected secondary winding 16 and varistor 30 extends a first main bridge power line 32 which in turn is connected to an alternating current input node 34 of a silicon controlled rectifier full wave bridge 40. Another alternating current input node 35 of the bridge 40 is connected via another main bridge power line 33 to the other end of the parallel connected secondary winding 16 and varistor 30 as illustrated.

Inserted in series in line 33 is a primary winding 36 of a current transformer 37 having a secondary winding 38 paralleled by a load resistor 39 for developing on a pair of charging current sensing lines 65, 66, an alternating current voltage signal that is indicative of the amount of current provided via line 33 to the full wave bridge 40. As will be subsequently discussed, the transformer 37 and lines 65, 66, and other related components, constitute means for sensing the current provided to a battery undergoing charging by the circuitry of FIGS. 1 and 2, and for providing a first signal indicative of the amount of the charging current.

The bridge 40 is conventional and includes a first main rectifying diode 41 and a first main silicon controlled rectifier 42 forming opposed legs of the full wave bridge 40. In a similar fashion, the bridge 40 also includes a second main rectifying diode 43 and a second main silicon controlled rectifier 44 constituting the other half of the full wave bridge 40. These four elements 41, 42, 43, 44 are interconnected as illustrated to provide full wave rectification of the alternating current provided at input nodes 34, 35.

The bridge 40 includes a positive direct current voltage output node 45 and a direct current ground node 46. A capacitor 51 is connected in series with a resistor 52, the capacitor 51 and resistor 52 constituting a commutation assisting network connected in parallel across the anode and cathode of the second silicon controlled rectifier 44 as illustrated. The network constituted by the capacitor 51 and resistor 52 acts in a known manner to supply current to rectifier 44 when it initially turns on so as to enhance its switching action.

In a similar fashion, a capacitor 53 and a resistor 54 are connected in series with each other and then connected as a commutation assisting network in parallel across the anode and cathode of the first silicon controlled rectifier 42 as illustrated to optimize its switching action.

As is well known in the art, 240 volt line power provided via the isolation transformer 15, in the form of 60 hertz alternating current, is applied to the input nodes 34, 35 of the full wave bridge 40 which at its output nodes 45, 46 provides 240 volt, 120 hertz, pulsating direct current on a pair of direct current power output lines 47, 48. The duration of each direct current pulse provided on lines 47, 48 is determined by the gating or firing of the silicon controlled rectifiers 42, 44 at times (firing angles) relative to the zero voltage crossing point of the alternating current applied to the bridge 40 at its input nodes 34, 35. This technique is termed phase triggering and is well known in the art. The firing angles of the silicon controlled rectifiers 42, 44 are generally identical at any point in time and are determined by a unijunction transistor relaxation oscillator 70 that will be subsequently discussed.

The pulsating direct current on output lines 47, 48 is provided to a battery 49 which is undergoing a charging operation. The voltage across the battery 49 is measured by a conventional volt meter 60 having its positive input connected to line 47 and its negative input connected to line 48 via a current limiting resistor 61. The meter 60 gives a visual indication of the voltage across the battery, i.e. the average output voltage of the direct current pulse generating bridge 40. A conventional amp meter 62 is series inserted in line 48 as illustrated so as to measure the amount of current being forced through the battery 49 undergoing charging. A pair of charging voltage sensing lines 63, 64 connected across the battery 49 are provided to the control circuitry of FIG. 2 which will be subsequently illustrated. The charging voltage sensing lines 63, 64, and related circuitry, constitute means for sensing the charging voltage applied to the battery, and for providing a second signal indicative of the amount of such charging voltage.

With reference to the top portion of FIG. 1, the earlier noted unijunction transistor relaxation oscillator 70 for phase triggering the silicon controlled rectifiers 42, 44 of the bridge 40, will now be discussed. The secondary winding 19 of the line isolation and step down transformer 18 has connected across it a conventional pilot light 73 which indicates that the battery charging circuit is energized. The voltage of secondary winding 19 is provided via another pair of input power lines 71, 72 to the input side of a conventional full wave bridge constituted by four appropriately interconnected diodes 74, 75, 76, 77 that function to provide pulsating direct current at bridge output nodes 78, 79; node 78 being a positive direct current voltage node relative to a direct current ground line 68 connected to node 79.

A current limiting resistor 80, in series with the output of the bridge, regulates the output current of the bridge constituted by the diodes 74–77. Connected in parallel across the resistor 80 is a pull down capacitor 81 which assures that the pulsating direct current, at its trailing edges, reaches and maintains for a brief period of time a zero voltage condition. This feature assists in the switching of the oscillator 70 by developing more current for a clipper zener diode 82 on the rising edges of the direct current pulses provided by the bridge of diodes 74–77.

The clipping zener diode 82 has its cathode connected to the non-bridge end of the parallel network of resistor 80 and capacitor 81 as illustrated, with its anode connected to the direct current ground lines 68. The zener diode 82 functions in a conventional manner to clip off the top portions of the 120 hertz direct current pulses provided by the bridge constituted by diodes 74, 77 so as to provide generally square waves having relatively fast rise times that can be applied to the primary winding 90 of an isolation transformer when a unijunction transistor 85 rapidly switches to its conducting condition. A threshold resistor 83 sets the valley point at which the unijunction transistor 85 will fire and become conductive so as to provide a sharply rising current pulse through the primary winding 90 which in turn generates in secondary windings 91, 92 triggering voltage pulses for alternately firing or commutating the silicon controlled rectifiers 42, 44. The secondary windings 91, 92 are each paralleled by respective pulse width increasing capacitors 93, 94 that enhance, in a known manner, commutation of the silicon controlled rectifiers 42, 44.

The point in time that the unijunction transistor 85 switches to a conducting condition relative to the zero voltage crossing point of the associated alternating current on lines 32, 33 of the bridge 40 are controlled by a direct current signal on a firing angle signal control line 67 which provides a control voltage relative to ground line 68. With further reference to the oscillator 70, a current limiting resistor 88 determines the maximum charging rate (minimum charging time) of a unijunction transistor triggering capacitor 87, the interconnection point of the resistor 88 and the capacitor 87 being in turn connected to control line 67, and to the emitter 84 of the transistor 85 having one of its bases connected to the cathode of zener diode 82 via resistor 83, and having its other base connected to one end of the primary winding 90 which in turn as its other end connected to the anode of the zener diode 82.

The circuitry thus far discussed constitutes the main power portion of the battery charging circuit of the present invention. It can be seen that the incoming 240 volt alternating current on lines 32, 33 is converted into 120 hertz pulsating direct current on lines 47, 48, each of these pulses having a pulse width determined by the oscillator 70 that provides phase triggering of the silicon controlled rectifiers 42, 44 in the bridge 40. The oscillator 70 in turn is controlled by a direct current control signal across lines 67 and 68, this control signal determining at what points in time, relative to the zero crossing points of the alternating line current supplied to the charging circuit, the rectifiers 42, 44 are fired so as to insure that the battery 49 is not subjected to an overvoltage or overcurrent condition during a charging cycle. That is, if an overvoltage or overcurrent condition is sensed by the feedback type control circuitry of FIG. 2, as will be subsequently explained, the width of pulses provided to the battery will decrease. Conversely, if an undervoltage or undercurrent condition is sensed, the widths of the pulses provided to the battery will increase. From a regulation standpoint, the width of pulses will maintain an optimum charging voltage and charging current on the battery 49 during a charging sequence. As noted earlier, the voltage across the battery is continuously monitored by lines 63, 64 while the charging current flowing through the battery is continuously monitored by lines 65, 66.

Regulation of the output voltage and current of the charging circuitry of FIG. 1 as thus discussed will now be detailed with reference to FIG. 2.

The charging current sensing signal across lines 65, 66 is provided to a charging current regulation circuit 100, while the charging voltage sensing signal across lines 63, 64 is provided to a charging voltage regulation circuit 120. The alternating current voltage signal indicative of the level of output current being provided to the battery undergoing charging is provided via lines 65, 66 to input nodes 101, 102 of another full wave bridge constituting a portion of the charging current regulation circuit 100. This full wave bridge is comprised of four diodes 103, 104, 105, 106 interconnected in a conventional manner so as to convert the incoming 60 hertz alternating current voltage applied across input nodes 101 and 102 to a 120 hertz pulsating direct current voltge; this pulsating direct current voltage being filtered to provide a relatively smooth direct current output voltage at output nodes 107, 108 by means of a conventional filter capacitor 109 connected across the nodes 107, 108 as illustrated.

The voltage across filter capacitor 109, which is indicative of the amount of output current of the battery charger, is provided across a voltage divider network constituted by three series connected resistors 110, 111, 112. Resistor 111 is a variable calibration resistor that can be factory set while resistor 110, also of the variable type, is adjustable by the user to set and establish a maximum amount of charging current that is desired to be provided to the particular battery undergoing charging.

The interconnection point of resistors 110 and 111 provides a direct current voltage indicative of the battery charging current to the reference electrode 114 of a first adjustable zener diode 115 via a resistor 113 which provides a source resistance for the reference terminal 114. The adjustable zener diode 115 has its anode connected to a common direct current ground line 69. The cathode of the adjustable zener diode 115 is connected via a current limiting resistor 118 to control line 67 which, as noted earlier, regulates the oscillator 70 discussed with regard to FIG. 1. A resistor 116 is series connected with the capacitor 117 to constitute a network connected in parallel across the cathode and reference terminal 114 of the adjustable zener diode 115. This network acts in a conventional manner as a phase shift network to optimize the operation of the adjustable zener diode 115.

It is to be noted that, in accordance with the present invention, the adjustable zener diode 115 operates in its active or linear region, like a linear amplifier, wherein the amount of current flow through the adjustable zener diode 115 from cathode to anode is generally proportional to the voltage at its reference terminal 114. This is contrary to the conventional use of the adjustable zener diode 115 which normally operates as a voltage regulator, whereby the output voltage is determined by the signal on the reference terminal 114.

It can be seen that the direct current voltage signal at the reference terminal 114 of adjustable zener diode 115 is determined by the amount of current being provided to the battery undergoing charging. This feedback-type signal on reference terminal 114 in turn causes the current flow through adjustable zener diode 115 from cathode to anode to be proportional to the output current of the battery charger. The adjustable zener diode 115 acts to sink more or less direct curent via resistor 118 from capacitor 87 via control line 67 (line 68 is connected to the common direct current ground line 69) and thus regulates the charging time of capacitor 87 of the oscillator 70 (see FIG. 1). This in turn regulates at what points in time, relative to the zero voltage crossing point of the input alternating current voltage, the unijunction transistor 85 will fire to effect the desired level for charging of the battery via the full wave bridge 40.

By way of example, if an undercurrent condition exists, the current flow through adjustable zener diode 115 will decrease, thus allowing capacitor 87 to charge at a higher rate, wherein the firing angles of rectifiers 42, 44 decreases so as to apply more power to, and thus increase the amount of current flow through, the battery 49. For an overcurrent condition, current flow through adjustable zener diode 115 increases to delay the charging rate of capacitor 87, and thus increase the firing angles of the rectifiers 42, 44 so as to apply less power to the battery 49.

Figure 2:
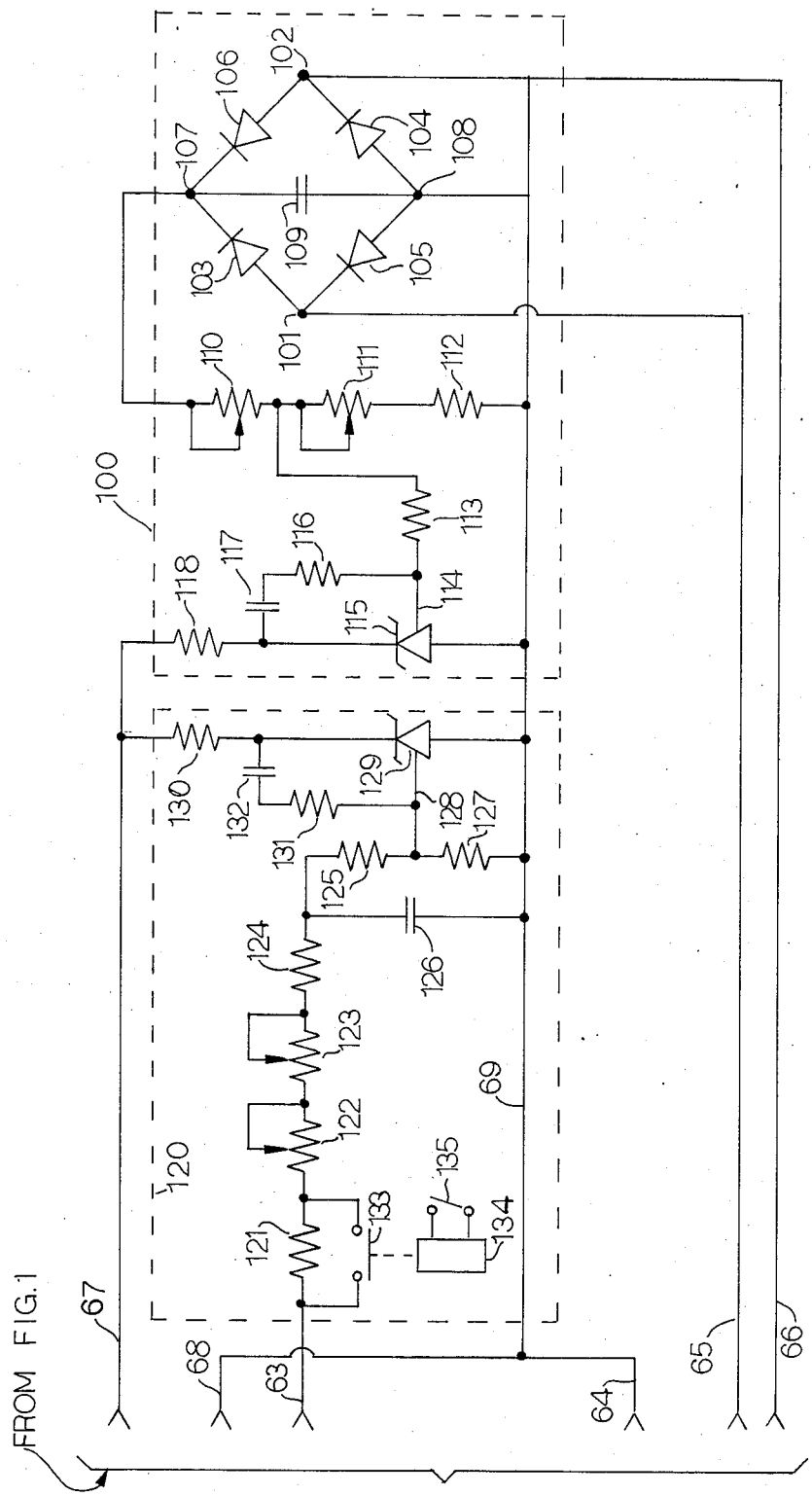
FIG. 2 is a schematic diagram of the feedback control portion of the battery charging circuit in accordance with the present invention.

With further reference to FIG. 2, the charging voltage regulation circuit 120 will now be discussed. This regulation circuit 120 functions in a similar manner to the charging current regulation circuit 100. A 120 hertz pulsating direct current feedback voltage constituting a signal indicative of the amount of voltage being applied to the battery is provided across lines 63, 64 is illustrated in FIG. 2, line 64 also being connected to the common direct current grounding line 69 as illustrated. This positive direct current voltage is provided on line 63 to one end of a series of resistors 121, 122, 123, 124 having its other end connected to one side of a voltage averaging capacitor 126, in turn having its other end connected to the common ground line 69. These resistors 121, 122, 123, 124 constitute means for programming the regulation circuit 120 so as to determine the maximum output voltage to which the battery will be allowed to charge. Resistor 123 for example is factory adjusted for calibration, while resistor 122 is panel mounted to allow user adjustment for the desired maximum output voltage of the charger.

The voltage from the output voltage programming resistor network is applied to the reference terminal of a second adjustable zener diode 129 via a resistor 125. The reference terminal 128 of the adjustable zener diode 129 is also connected to the common ground line 69 as illustrated via a resistor 127. This resistor 127 establishes in a conventional manner a threshold switching point for the adjustable zener diode 129. The capacitor 126, with resistor 125, acts to smooth out the pulsating direct current voltage applied through resistors 122, 123, 124 so as to provide an average direct current voltage indicative of the pulsating direct current charging voltage on the battery 49 (see FIG. 1), this average voltage being applied to the reference terminal 128 of the adjustable zener diode 129.

The second adjustable zener diode 129, like adjustable zener diode 115 discussed earlier, also operates in its active or linear region so as to function as an amplifier so that the current flow from cathode to anode through the adjustable zener diode 129 is proportional to the level of voltage on the reference terminal 128 which in turn is proportional to the average level of the battery charging voltage as indicated by the feedback signal on line 63. Another current limiting resistor 130, similar in function to resistor 118 discussed earlier, is connected between the cathode of the second adjustable zener diode 129 and the control line 67 as illustrated. A resistor 131 is series connected with a capacitor 132, these elements constituting a network connected across the reference electrode 128 and the cathode of adjustable zener diode 129, this network functioning as a phase shift network that stabilizes the operation of the adjustable zener diode 129 as is well known in the art.

For an overvoltage condition, the adjustable zener diode 129 will conduct more current so as to apply less charging current to capacitor 87 (see FIG. 1) of the oscillator 70 thus increasing the firing angles of the silicon controlled rectifiers 42, 43 of the bridge 40 whereby the average voltage applied to the battery is reduced. Conversely, in an undervoltage condition, the amount of current through adjustable zener diode 129 will decrease so as to increase the charging rate of capacitor 87 so that the widths of pulses applied to the battery will increase since the firing angles of the silicon controlled rectifiers 42, 44 are reduced.

Resistor 121 is normally bypassed by a set of normally closed relay contacts 133 which in turn are controlled by a conventionally powered relay coil 134 energized by a user operated switch 135. Occasionally, it is desirable for a battery to be "refreshed" by charging it to a point slightly above its normal voltage. For example, a 12 volt battery will be charged to 14.5 volts for a brief period of time. This "refresh" technique is well known in the art and serves to insure that the battery will be capable of providing its maximum rated amperage. In practice, the user effects such a "refresh" charge by closing switch 135 to energize the relay coil 134 which in turn will open switch 133 so as to electrically series insert resistor 121 into the resistor network comprised by resistors 121, 122, 123, 124, this in turn causing the output voltage of the battery charger to rise to a predetermined degree as will become apparent. After a "refresh" time period, the relay coil 134 can be de-energized either manually or automatically to re-establish a normal charging operation.

To summarize, a battery charging circuit in accordance with the present invention has been provided wherein the charging current and the charging voltage are both regulated so as not to exceed predetermined limits. Means for sensing the amount of charging current provided to the battery, so as to generate a first signal indicative of the amount of charging current, is constituted by current transformer 37 and its related circuit components. The first adjustable zener diode 115 operating in its linear region so as to function as an amplifier has applied to it the first signal indicative of the charging current as provided by the current transformer 37 wherein the amount of current flow through the diode is generally proportional to the amount of charging current, the current flow through adjustable zener the diode in turn affecting the operation of the oscillation 70 which controls the firing of the SCR bridge 40. This oscillator 70, in effect, constitutes means responsive to the current flow through the adjustable zener diode 115 for regulating the charging current.

This close loop feedback system, as to current regulation, is also used in voltage regulation wherein the voltage across the battery is sensed and there is provided a second signal that is indicative of the average level of charging voltage. This second signal is applied to the reference terminal of a second adjustable zener diode operating in its linear region so as to function as an amplifier wherein current flow through this second adjustable zener diode is generally proportional to the amount of voltage across the battery being charged. This current flow through the second adjustable zener diode is then also used to regulate the operation of the oscillator 70 so as to establish the desired firing angle of the silicon controlled rectifier bridge 40 so as to regulate and maintain the charging voltage at a desired level not greater than a predetermined limit. It can be seen that the oscillation acts as means responsive to current flow through the second adjustable zener diode 129 for regulating the charging voltage.

In operation, by adjusting the appropriate panel mounted potentiometers, both current and voltage limits can be set by the user. The charging circuitry of the present invention has been found to be highly reliable and low in cost, while providing excellent regulation of charging current and charging voltage. The unique application of the adjustable zener diodes 115, 129 operating in their active or linear regions so as to function as amplifiers provides for excellent circuit response time, and excellent temperature stability.

Although a preferred embodiment of this invention has been shown and described, it should be understood that various modifications and rearrangements of the parts may be resorted to without departing from the scope of the invention as disclosed and claimed herein.

What is claimed is:

1. In a battery charging circuit for providing a battery with a charging current not greater than a predetermined current limit and a charging voltage not greater than a predetermined voltage limit, the improvement comprising:

means for sensing the amount of charging current provided to the battery by the charging circuit, said charging current sensing means generating a first signal indicative of the amount of charging current;

a first adjustable zener diode operating in its linear region as an amplifier, and having an anode, a cathode, and a reference terminal, said first signal being applied to said reference terminal of said first adjustable zener diode wherein the amount of current flow through said first adjustable zener diode from cathode to anode is generally proportional to the amount of charging current;

means for sensing the amount of charging voltage provided across the battery by the charging circuit, said charging voltage sensing means generating a second signal indicative of the level of charging voltage;

a second adjustable zener diode operating in its linear region as an amplifier and having an anode, a cathode, and a reference terminal, said second signal being applied to said reference terminal of said second adjustable zener diode wherein the amount of current flow through said second adjustable zener diode from cathode to anode is generally proportional to the amount of charging voltage; and means responsive to said current flow through said first adjustable zener diode and to said current flow through said second adjustable zener diode, said responsive means regulating the charging current and charging voltage so that the charging current is provided to the battery at a level not greater than said predetermined current limit and the charging voltage is provided across the battery at a level not greater than said predetermined voltage limit, whereby the charging rate is continuously optimized.

2. A battery charging circuit according to claim 1, wherein said responsive means includes a capacitor whose rate and level of charge determine the amount of charging current and voltage provided to the battery, the current provided to charge said capacitor being affected by the current flow through both said first adjustable zener diode and said second adjustable zener diode.

3. In a battery charging circuit for providing a battery with a charging voltage and current not greater than predetermined limits, the charging circuit including a full wave, silicon controlled rectifier bridge having an input for receiving alternating current, and having an output for providing pulsating direct current to said battery, the durations of the direct current pulses applied to the battery, and thus the effective level of voltage and amount of current applied to the battery, being determined by the firing angles of silicon controlled rectifiers forming a part of said bridge, the improvement comprising:

means for sensing the amount of charging current provided to the battery by the charging circuit, said charging current sensing means generating a first signal indicative of the amount of charging current;

a first adjustable zener diode operating in its linear region as an amplifier, and having an anode, a cathode and a reference terminal, said first signal being applied to the reference terminal of said first adjustable zener diode wherein the amount of current flow through said first adjustable zener diode from cathode to anode is generally proportional to the amount of charging current;

means for sensing the amount of charging voltage provided across the battery by the charging circuit, said charging voltage sensing means generating a second signal indicative of the level of charging voltage;

a second adjustable zener diode operating in its linear region as an amplifier, and having an anode, a cathode and a reference terminal, said second signal being applied to the reference terminal of said second adjustable zener diode wherein the amount of current flow through said second adjustable zener diode from cathode to anode is generally proportional to the amount of charging voltage; and means responsive to current flow through both said first and second adjustable zener diodes, said responsive means establishing and regulating the said firing angles of the silicon controlled rectifiers forming a part of said bridge, wherein charging voltage and current are provided to the battery at levels not greater than said predetermined limits, whereby the charging rate is continuously optimized.

4. A battery charging circuit according to claim 3, wherein said responsive means includes an oscillator providing triggering pulses that are applied to the gate electrodes of said silicon controlled rectifiers.

5. A battery charging circuit according to claim 4, wherein said oscillator includes a capacitor whose rate and level of charge determines at what points in time said triggering pulses are provided relative to the times of the zero voltage crossing points of the alternating current provided to the input of said bridge.

* * * * *